(12) United States Patent
Adl-tabatabai et al.

(10) Patent No.: US 7,809,903 B2
(45) Date of Patent: Oct. 5, 2010

(54) COORDINATING ACCESS TO MEMORY LOCATIONS FOR HARDWARE TRANSACTIONAL MEMORY TRANSACTIONS AND SOFTWARE TRANSACTIONAL MEMORY TRANSACTIONS

(75) Inventors: Ali-Reza Adl-tabatabai, Santa Clara, CA (US); Bratin Saha, San Jose, CA (US); Richard L. Hudson, Florence, MA (US); Haitham Akkary, Portland, OR (US); Ravi Rajwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 11/303,529

(22) Filed: Dec. 15, 2005

(65) Prior Publication Data

US 2007/0143287 A1 Jun. 21, 2007

(51) Int. Cl.
*G06F 12/12* (2006.01)
(52) U.S. Cl. .................................. 711/159
(58) Field of Classification Search .................. 711/159
See application file for complete search history.

(56) References Cited

U.S. PATENT DOCUMENTS

| | | | |
|---|---|---|---|
| 6,640,285 B1 * | 10/2003 | Bopardikar et al. | 711/133 |
| 7,395,382 B1 * | 7/2008 | Moir | 711/147 |
| 7,502,897 B2 | 3/2009 | Hertzberg et al. | |
| 7,542,977 B2 | 6/2009 | Hudson et al. | |
| 2002/0108025 A1 * | 8/2002 | Shaylor | 711/203 |
| 2007/0156780 A1 | 7/2007 | Saha et al. | |
| 2007/0156994 A1 | 7/2007 | Akkary et al. | |
| 2007/0162520 A1 | 7/2007 | Petersen | |
| 2007/0186056 A1 | 8/2007 | Saha et al. | |
| 2008/0270745 A1 | 10/2008 | Saha et al. | |

OTHER PUBLICATIONS

Ennals, R., "Software Transactional Memory Should Not be Obstruction-Free", [online], [Retrieved Sep. 14, 2005], retrieved from the Internet at <URL: http://www.cambridge.intel-research.net/~rennals/notlockfree.pdf>.

Harris, T. and K. Fraser, "Language Support for Lightweight Transactions", *Proceedings of the 18th annual ACM SIGPLAN Conference on Object-oriented Programming, Systems, Languages, and Applications*, Oct. 2003, pp. 388-402.

Herlihy, M. and J.E.B. Moss, "Transactional Memory: Architectural Support for Lock-Free Data Structures", *Proceedings of the 20th annual International Symposium on Computer Architecture*, 1993, pp. 289-300.

(Continued)

*Primary Examiner*—Tuan V Thai
*Assistant Examiner*—Duc T Doan
(74) *Attorney, Agent, or Firm*—Trop, Pruner & Hu, P.C.

(57) ABSTRACT

Provided is a method, system, and program for coordinating access to memory locations for hardware transactional memory transactions and software transactional memory transactions. A hardware transaction executing in hardware transactional memory initiates a request to access a memory location. A fault is returned to the hardware transaction request in response to an operation by one software transaction executing in a software transactional memory.

19 Claims, 6 Drawing Sheets

OTHER PUBLICATIONS

Hewlett-Packard Development Company, "Memory-Relevant Portions of the Processor", [online], [Retrieved on Sep. 18, 2005], retrieved from the Internet at <URL: http://docs.hp.com/cgi-bin/pf-new.cgi?IN/=/en/5965-4641/ch01s05.html&printable=1>.

Lie, S. and C.S. Anderson, "An Integrated Hardware-Software Approach to Transactional Memory", *MIT Computer Science and Artificial Intelligence Laboratory*, Feb. 2004, pp. 1-2. [Abstract].

Lie, S., "An Integrated Hardware-Software Approach to Transactional Memory", *6.895 Theory of Parallel Systems*, [Paper], pp. 1-18.

Lie, S., "An Integrated Hardware-Software Approach to Transactional Memory", *6.895 Theory of Parallel Systems*, [Presentation], Monday Dec. 8, 2003.

Rajwar, R., M. Herlihy, and K. Lai, "Virtualizaing Transactional Memory", *ACM SIGARCH Computer Architecture News*, vol. 33, Issue 2, May 2005, pp. 494-505.

Stenstrom, P., "A Survey of Cache Coherence Schemes for Multiprocessors", *Computer*, vol. 23, Issue 6, Jun. 1990, pp. 12-24.

Chang, A., and M. F. Mergen, "801 Storage: Architecture and Programming," ACM Transactions on Computer Systems, vol. 6, No. 1, Feb. 1988, pp. 28-50, [XP-00004740].

Lev, Y., and J. Maessen, "Towards a Safer Interaction with Transactional Memory by Tracking Object Visibility", Proceedings of Synchronization and Concurrency In Object-Oriented Languages (SCOOL), Oct. 7, 2005, pp. 31-38, [XP-002432120].

Lie, S., "Hardware Support for Unbounded Transactional Memory", Master's Thesis, Massachusetts Institute of Technology Department of Electrical Engineering and Computer Science, May 7, 2004, pp. 1, 3, 7, 8, 85-102, [XP-002434838].

Moir, M., "Hybrid Hardware/Software Transactional Memory", Sun Microsystems, Apr. 8, 2005, 21 pp. [XP002407376].

Moir, M., "Hybrid Transactional Memory", Announcement Sun Microsystems, Jul. 2005, pp. 1-16, [XP-002407375].

PCT International Search Report and Written Opinion, Jun. 12, 2007, for International Application No. PCT/US2006/046499, 11 pp.

Stonebraker, M., "Virtual Memory Transaction Managment", Operating Systems Review USA, vol. 18, No. 2, Apr. 1984, pp. 8-16, [XP-002434839].

Sukha, J., "Memory-Mapped Transactions", Master's Thesis, Massachusetts Institute of Technology Department of Electrical Engineering and Computer Science, Jun. 2005, 92 pp., [XP-002434529].

International Preliminary Report on Patentability (IPRP), Jun. 26, 2008, for International Application No. PCT/US2006/046499, 7 pp.

Stonebraker, M "Virtual memory transaction management" Operating Systems Review USA, vol. 18, No. 2, Apr. 1984, pp. 8-16.

Chang, A. et al. "801 Storage: Architecture and Programming", ACM Transactions on Computer Systems, ACM, New York, NY, US, vol. 6, No. 1, Feb. 1, 1988, pp. 28-50.

Lev, Y. et al. "Towards a Safer Interaction With Transactional Memory by Tracking Object Visibility", Proceedings of Synchronization and Concurrency in Object-Oriented Languages (SCOOL), OOPSLA 2005 Workshop, [On line] Oct. 7, 2005, pp. 31-38.

Lie , S: "Hardware Support for Unbounded Transactional Memory" Master's Thesis, Massachusetts Institute of Technology Department of Electrical Engineering and Computer Science, [Online] May 7, 2004, pp. 1, 3, 7, 8, 85-102.

Mark Moir, "Hybrid Transactional Memory," Jul. 2005, pp. 1-15.

State Intellectual Property Office, P.R. China, First Office Action issued Mar. 1, 2010, in Chinese application serial No. 200680046532.2.

* cited by examiner

Page Protection Attribute

FIG. 4

Transaction Descriptor

FIG. 5

Ownership Record

COORDINATING ACCESS TO MEMORY LOCATIONS FOR HARDWARE TRANSACTIONAL MEMORY TRANSACTIONS AND SOFTWARE TRANSACTIONAL MEMORY TRANSACTIONS

BACKGROUND

Transactional execution and memory allows programs to read and modify memory locations as a single atomic operation. A transaction is a finite sequence of machine instructions including memory reads and writes. A transaction may execute serially such that the steps of one transaction do not interleave with the steps of another. Further, a transaction is atomic and either commits its writes to memory so that the transaction's changes to memory are visible to other processes all at one time or aborts and discards the changes.

There are two models for transactional execution, hardware transaction memory (HTM) and software transaction memory (STM). HTM comprises hardware transactions implemented entirely in processor hardware. For hardware transactions, data may be stored in hardware registers and cache, such that all cache actions are done atomically in hardware and data in the HTM is only written to the main memory upon committing the transaction. The HTM holds all the speculative writes without propagating to the main system memory, such as a Random Access Memory (RAM) device, until the transaction commits. If the hardware transaction aborts, then the cache lines holding the tentative writes in the HTM are discarded. HTM hardware transactions may utilize cache coherency protocols to detect and manage conflicts between HTM hardware transactions. The cache coherency protocols keep track of accesses within a hardware transaction. If two hardware transactions are accessing a same memory location, then the HTM aborts one transaction if there is a conflict, else the transaction's changes may be committed to the system memory.

Software transactional memory (STM) is implemented in software. All speculative STM transactional data is stored in the system memory and indicated to be in a non-committed state. When the STM transaction commits, any data the transaction writes is indicated as committed and subsequently available to other threads and transactions. In certain STM systems, a flag may be set to indicate the data as committed and accessible and available in memory to other transactions.

HTM transactions usually require less overhead then STM transactions because HTM transactions occur entirely in hardware. HTM transactions may be limited to smaller transactions due to hardware limitations, whereas STM transactions can handle large and longer transactions.

There is a need in the art for techniques to allow HTM and STM transactions to operate together in an integrated environment and prevent conflicts between HTM and STM transactions in order to provide the efficiency of an HTM while providing the guarantees of an STM.

DETAILED DESCRIPTION

Figure 1:
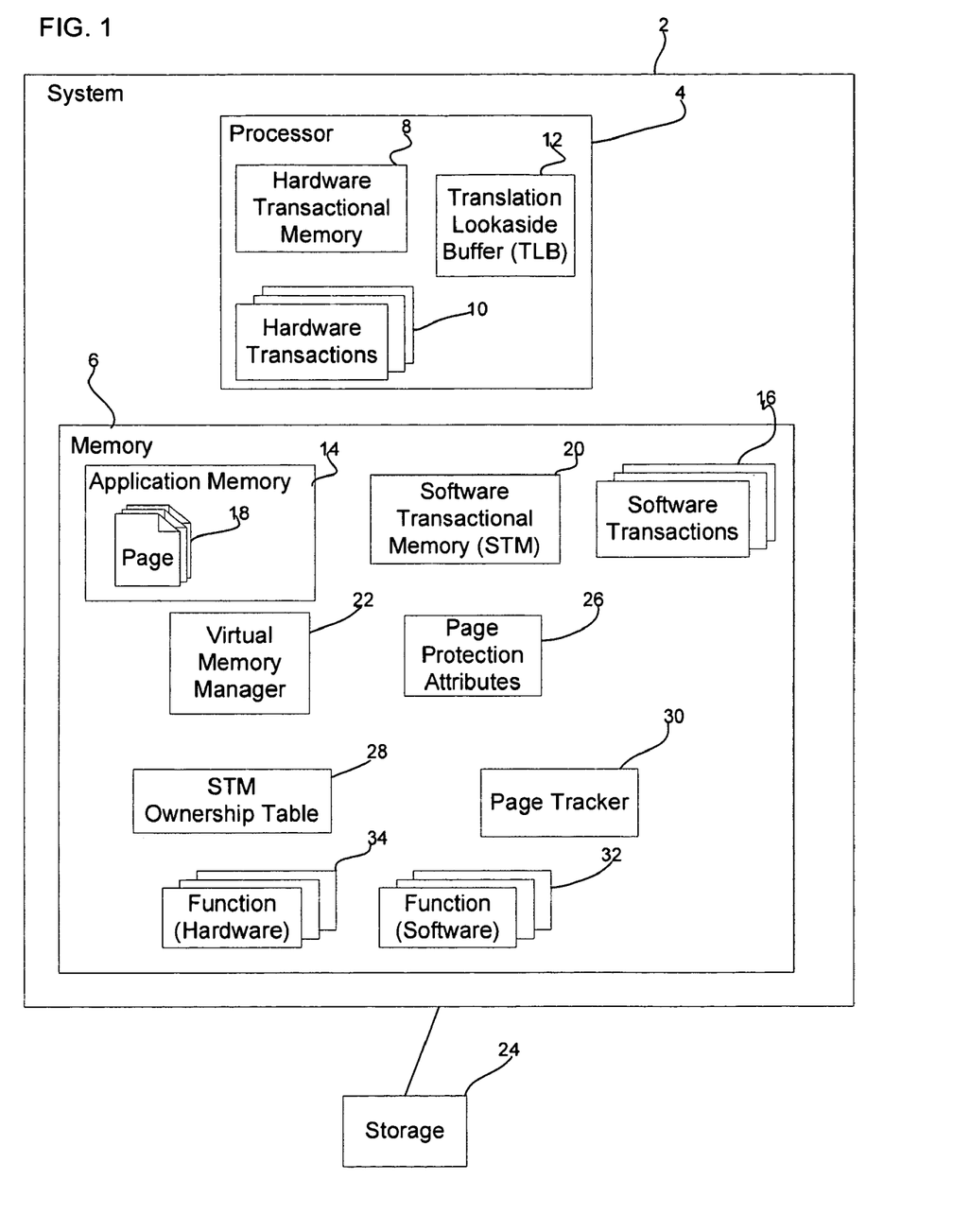
FIG. 1 illustrates an embodiment of a computing environment.

FIG. 1 illustrates an embodiment of a computing environment. A system 2 includes a processor 4, such as a central processing unit, and a memory 6, such as a volatile memory device used as the system 2 main memory. The processor 4 includes a hardware transactional memory (HTM) 8 comprising registers and other storage areas in the processor 4 hardware, such as an on-board cache, that stores data used by hardware transactions 10 executing in the processor 4 hardware. During the commit phase, a hardware transaction 10 writes updates from the HTM 8 to the memory 6. Hardware transactions 10 utilize techniques such as cache coherence protocols to prevent two or more hardware transactions 10 from performing conflicting operations with respect to a same memory location. The processor 4 further includes a translation lookaside buffer (TLB) 12 that enables the processor 6 to access data through virtual address space in the memory 6. The TLB 12 translates virtual addresses to physical addresses and checks access rights, so that access is granted to processor 4 hardware instructions, data, or I/O only if the requesting process has proper authorization.

The memory 6, which may be implemented in one or more electronic memory devices, includes an application memory 14 which stores data from applications and both hardware 10 and software transactions 16. The data in the application memory 14 may be stored in pages 18, where each page 18 has a plurality of addressable locations that map to virtual addresses. Software transactions 16 comprise atomic transactions whose data is stored in a software transactional memory (STM) 20 implemented in data structures in the memory 6. During the commit phase, writes stored in the STM 20 are applied to the application memory 14 to be available to other processes and transactions.

A virtual memory manager 22 manages the mapping of virtual addresses to physical addresses in the memory 6, where virtual addresses may address data in the memory 6 or on pages 18 swapped into a storage 24. The virtual memory manager 22 swaps in pages 18 of data from the storage 24 into the memory 6 when a page of data is accessed and swaps pages 18 of data out of memory 6 to the storage 24 to make room for pages in storage 24 having requested memory locations. The storage 24 may comprise a non-volatile storage device, such as a hard disk drive, or an electronic memory device, such as a lower-level volatile memory device or a non-volatile electronic memory, such as a flash memory device, Electronically Erasable Programmable Memory (EEPROM), etc. The virtual memory manager 22 maintains page protection attributes 26 comprising information on pages swapped into the memory 6 that is used to manage access to memory locations in the page 18.

Software transactions 16 utilize a software transactional memory (STM) ownership table 28 that is used by software transactions 16 to synchronize their access to memory locations in the application memory and to prevent two software transactions 16 from concurrently accessing and modifying the same memory location. A page tracker 30 provides a list of pages 18 in the application memory 14 that are being accessed by a software transaction 16. Each transaction capable of being executed in the system 2 may be compiled as both a software function 32 to be executed as a software transaction 16 and compiled as a hardware function 34 to be executed by a hardware transaction 10. In this way, any transaction may be executed in HTM 8 or STM 20 to provide an integrated approach to executing transactions.

Figure 2:
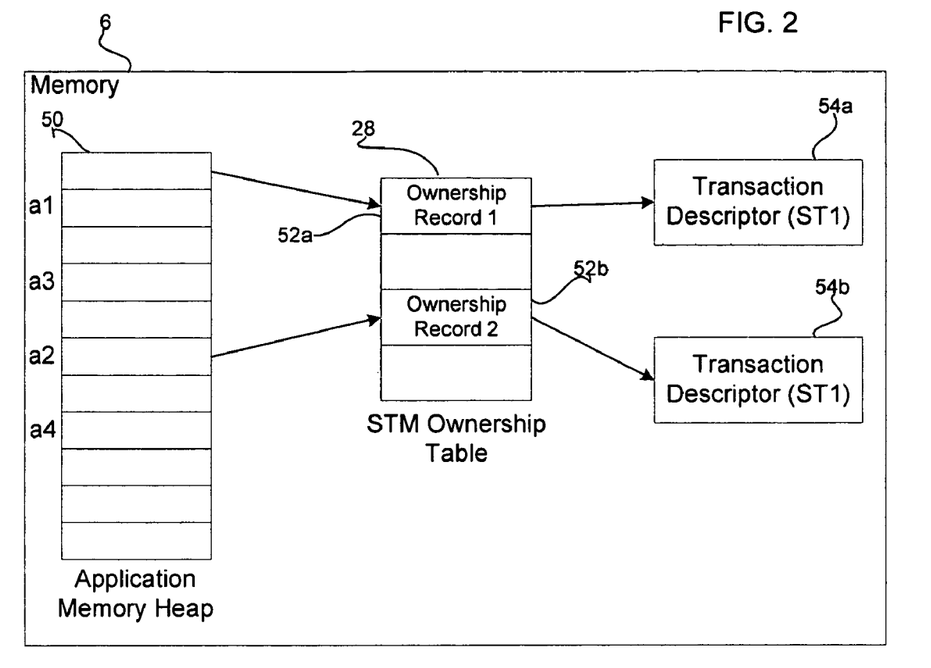
FIG. 2 illustrates an embodiment of memory locations mapping to records in an STM ownership table.

FIG. 2 illustrates an embodiment of how an addressable memory location, such as the shown virtual addresses a1, a2, a3, and a4, in application memory heap 50 map to ownership record entries, e.g., 52a, 52b, in the STM ownership table 28 The STM ownership table 28 is shared by software transactions 16, which may execute on separate threads in one process. A hash function may be used to map virtual memory address to the ownership record entries in the STM ownership table 28. Each owner record in the STM ownership table 28 points to a transaction descriptor, e.g., transaction descriptors 54a, 54b, that provide information on the software transaction 16 that "owns" or is granted access to the memory location. An STM ownership record may include a null pointer, or some other form of indication, if there is no transaction that is accessing that memory location.

Figure 3:
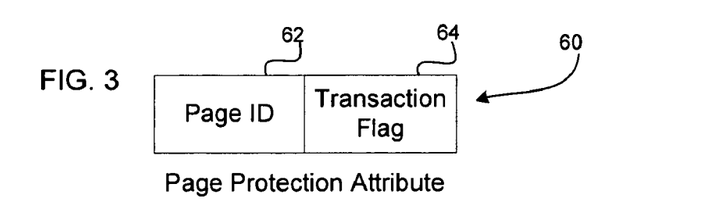
FIG. 3 illustrates an embodiment of page protection attribute information.

FIG. 3 illustrates an embodiment of information that may be included in an instance 60 of the page protection attributes 26 providing attribute information for one page 18. The page protection attribute 60 provides a page identifier (ID) 62 of the page 18 for which the attribute information is provided and a transaction flag 64 that indicates whether a software transaction 16 has access to one memory location on the identified page.

Figure 4:
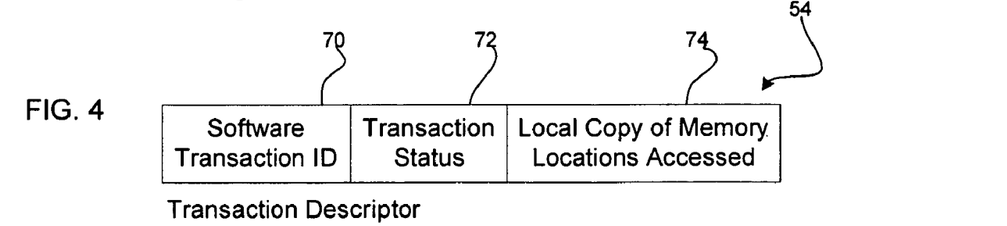
FIG. 4 illustrates an embodiment of transaction descriptor information for a software transaction FIG. 5 of an STM ownership record having information on a software transaction accessing memory location.

FIG. 4 illustrates an embodiment of information included in a transaction descriptor 54, e.g., 54a, 54b (FIG. 2), including: a transaction identifier (ID) 70 identifying one software transaction 16; a transaction status identifying a state of the software transaction, such as active (but not committed), committed (which means the software transaction is updating the memory locations in the application memory 14 accessed during the transaction with the updates from the STM 20), or completed indicating that the transaction is no longer accessing the memory location; and a local copy of memory locations 74 being accessed.

Figure 5:
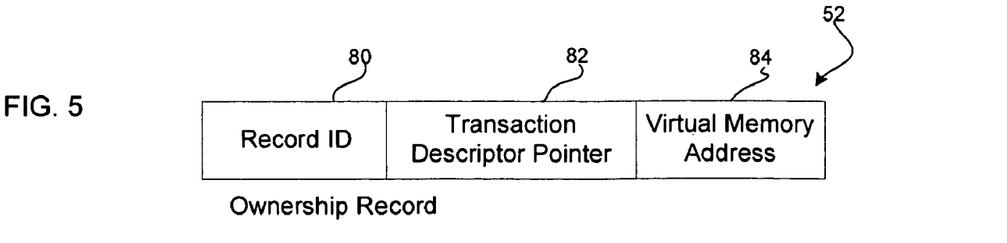

FIG. 5 illustrates an embodiment of information included in an STM ownership record 52, e.g., ownership records 52a and 52b (FIG. 2), including: a record identifier (ID) 80 identifying the ownership record, which may comprise an index to the record; a transaction descriptor pointer 82 identifying the transaction descriptor 54 that has access to the memory location associated with the ownership record 52; and the virtual memory address 84 used to access the memory location associated with the STM ownership record 52.

Figure 6:
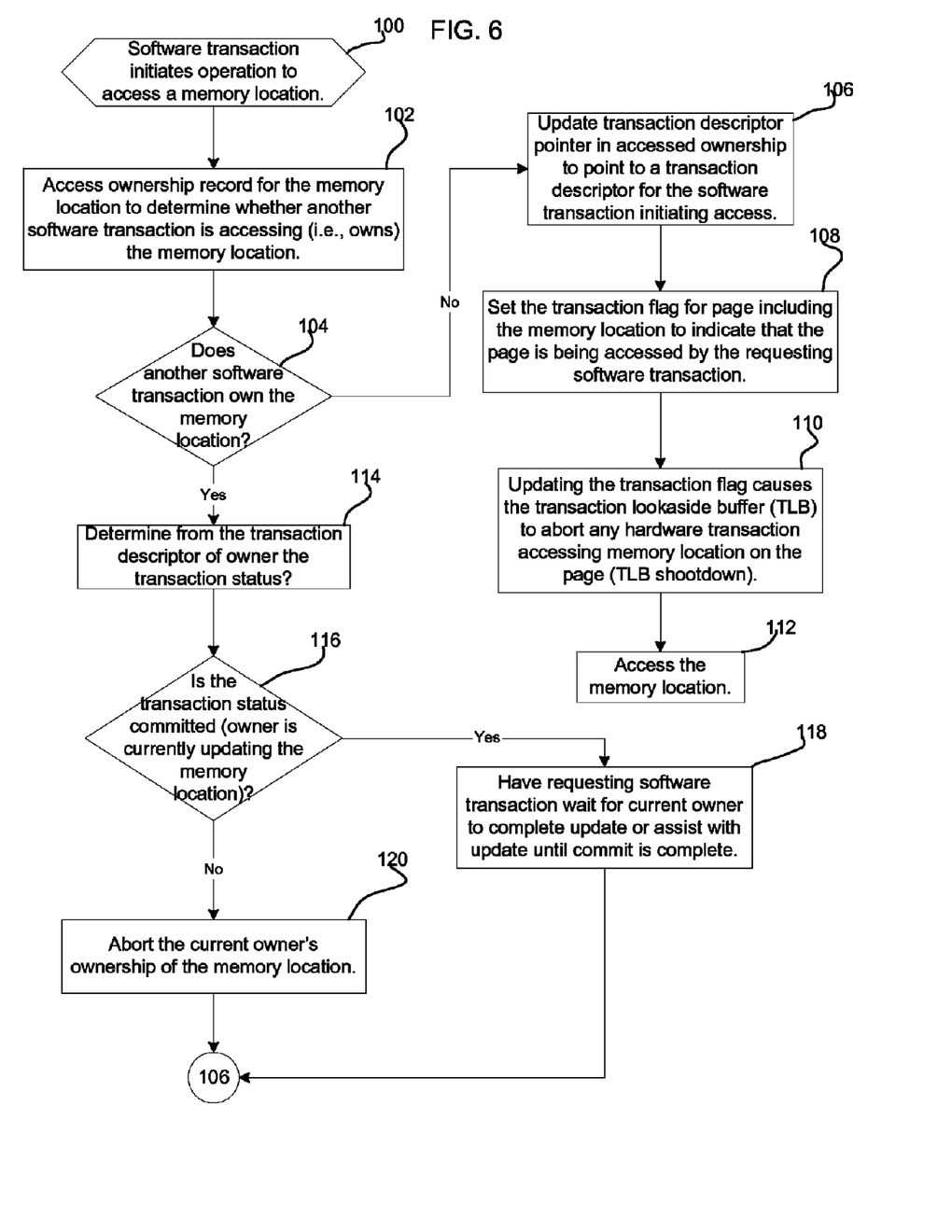
FIG. 6 illustrates an embodiment of operations performed by a software transaction to access a memory location.

FIG. 6 illustrates an embodiment of operations executed by a software transaction 16, coded in a compiled software function 32, to use the STM ownership table 28 to synchronize access to the application memory 14. At block 100, a software transaction 16 initiates an operation to access a memory location in the application memory 14 for a read or a write operation. To access the memory location, the software transaction 16 accesses (at block 102) the ownership record 52 for the memory location to determine whether another software transaction is accessing (i.e., owns) the memory location. The ownership record identifier 80 to access may be determined by applying a hash function to the virtual memory address of the memory location the software transaction 16 wants to access. Another software transaction is accessing this memory location if the accessed ownership record 52 includes a pointer 82 to a transaction descriptor 54 that does not have the completed or aborted transaction status 72 (FIG. 4). If (at block 104) another active software transaction does not own the memory location, then the software transaction requesting access updates (at block 106) the transaction descriptor pointer 82 in the accessed ownership record 52 for the memory location to point to the transaction descriptor identifying the software transaction initiating access. The software transaction sets (at block 108) the transaction flag 64 (FIG. 3) in the page protection attribute 60 for the page 18 including the requested memory location to indicate that the page is being accessed by a software transaction 16.

In one embodiment, updating (at block 110) the transaction flag 64 in the page protection attribute 60 may generate a page fault for that page or otherwise cause the TLB 12 in the processor 4 to abort any hardware transaction 10 accessing a memory location on the page 16. In one embodiment, a TLB shootdown may be performed to abort any hardware transactions 10 accessing a memory location on the page whose transaction flag 64 was updated. This process ensures that conflicts between hardware 10 and software 16 transactions are properly handled, because the hardware transaction 10 is aborted if a software transaction 16 accesses the memory location. The software transaction 16 may then access (at block 112) the memory location after updating the ownership record 52 for the memory location to identify the software transaction as having access to the memory location. The transaction status 72 may further be set to active indicating that the software transaction 16 has access to the memory location, but is not currently updating data in the memory location in the application memory 14, i.e., committing any writes. In the active (but non-commit) state, the software transaction 16 may be reading from the memory location or buffering updates in the STM 20. If (at block 104) another software transaction has access to the memory location, then the software transaction determines (at block 114) the transaction status 72 from the transaction descriptor 54 (FIG. 4) of the software transaction 16 whose transaction descriptor 54 is identified by the transaction descriptor pointer 82 in the ownership record 52 for the memory location. If (at block 116) the transaction status is committed, i.e., the memory location in the application memory 14 is being updated with writes in the STM 20, then the requesting software transaction 16 may wait for the current owner to complete the update or assist with update. After the current software transaction owning access completes the updates, control proceeds to block 106 to provide access to the memory location to the requesting software transaction. Otherwise, if the transaction status 72 is not-committed but active, then the current owner's ownership of the memory location is aborted (at block 120) and control proceeds to block 106 to provide access and ownership of the memory location to the requesting software transaction 16. In certain embodiments, the current software transaction owning the memory location is not aborted if it is in a state from where it can not be rolled back. A transaction can be "rolled back" if the changes performed by the transaction can be reversed (i.e., returned to the state before the transaction began) if the transaction is terminated. The current software transaction owner may be aborted if it is in a state from where it can be rolled back. The operation at block 116 of checking whether the current owner software transaction is updating the memory location is one embodiment of checking whether the transaction can be rolled back.

Figure 7:
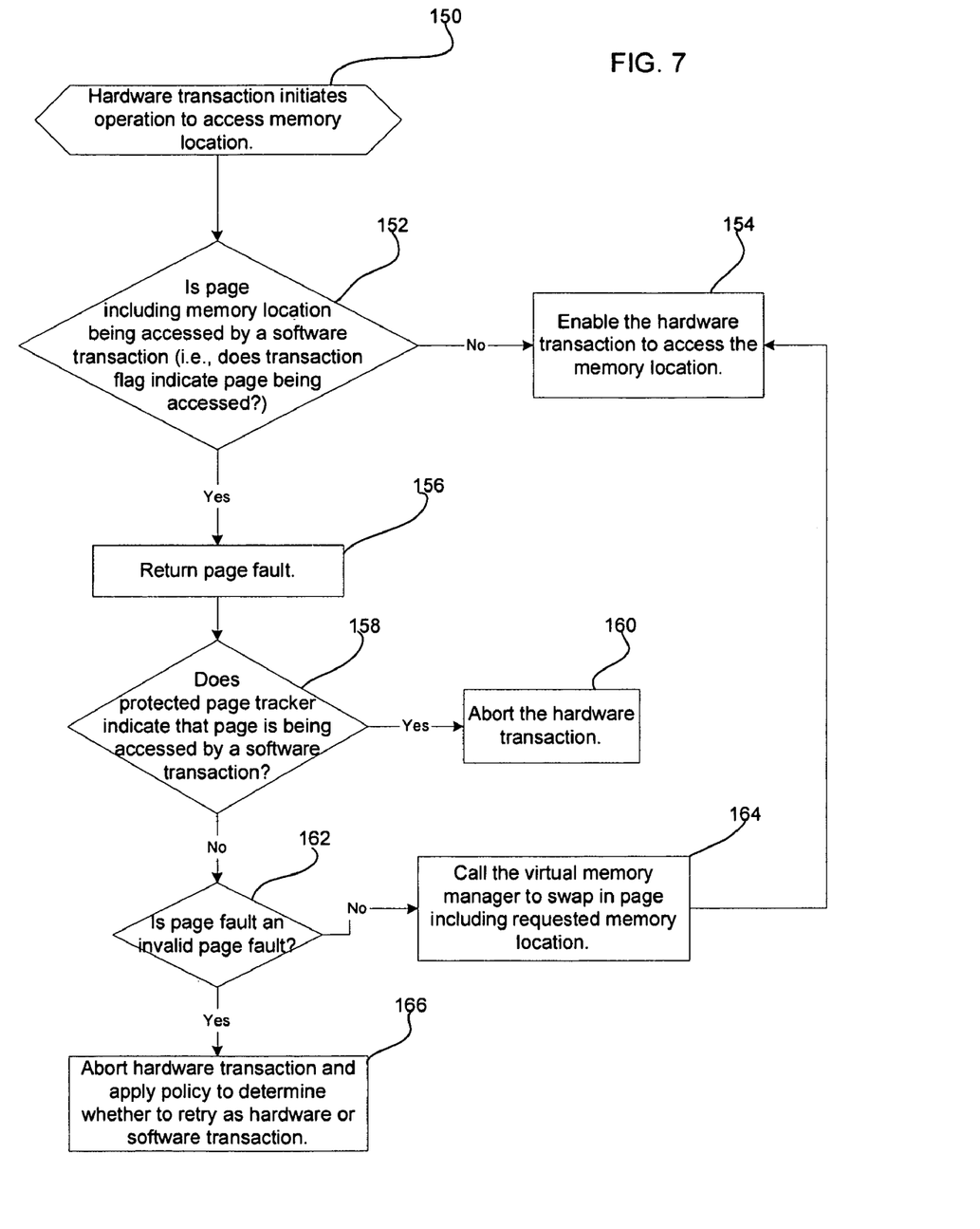
FIG. 7 illustrates an embodiment of operations performed by a hardware transaction to access a memory location.

FIG. 7 illustrates an embodiment of operations executed by a hardware transaction 10, coded in a compiled hardware function 34, to use the page protection attributes 26 to synchronize access to the application memory 14. At block 150, a hardware transaction 10 initiates an operation to access a memory location in the transaction memory 8. The hardware transaction 10 determines (at block 152) whether the page 18 including the requested memory location is being accessed by a software transaction. This may be determined by the TLB 12 or some other processor 4 hardware determining whether the transaction flag 64 in the page protection attribute 60 for the page including the requested memory location indicates that the page 18 has a memory location being accessed by one software transaction 16. If (at block 152) the page 18 including the requested memory location is not being accessed, then the hardware transaction 10 is provided access (at block 154) to the memory location.

Otherwise, if (at block 152) the transaction flag 64 is set to indicate that a software transaction 16 has access to the page including the requested memory location, then a page fault is returned (at block 156) to the requesting hardware transaction 10. The hardware transaction 10 may then determine (at block 158) whether the page tracker 30 indicates that page is being accessed by a software transaction 16. In one embodiment, the hardware transaction 10 may execute an abort handler to determine whether the page fault is the result of a software transaction accessing the page including the requesting memory location or is caused by a type of page fault that may be corrected by calling the virtual memory manager 22 to swap the page 18 including the requested memory location into the application memory 16. If (at block 158) the page tracker 30 or some other information indicates that the page is being accessed by a software transaction 16, then the requesting hardware transaction 10 aborts (at block 160). Otherwise, if (at block 158) the page fault is not caused by a software transaction 16 accessing a memory location on the page, then the hardware transaction 10 determines (at block 162) whether the page fault is an invalid page fault which may result in a general protection fault, i.e., a page fault that cannot be remedied. If (at block 162) the page fault is not an invalid page fault, then (at block 164) the virtual memory manager 22 may swap in the page 18 including the requested memory location. The hardware transaction 10 may then access (at block 154) the page 18 after it is swapped into the application memory 14.

Otherwise, if the page fault is an invalid page fault that cannot be remedied by swapping the page 16 from storage 24 into the application memory 14, then the hardware transaction is aborted (at block 166) and the hardware transaction or other code managing the fault may determine whether to retry the function as a hardware transaction 10 executing the hardware 34 version of the function or as a software transaction 16 executing a software version 32 of the function. The policy may provide for retrying the aborted hardware transaction a predetermined number of times before retrying as a software transaction and executing the software version of the function 32.

The embodiment of FIG. 7 provides operations to determine whether a hardware transaction will conflict with a software transaction by preventing the hardware transaction from accessing a requested memory location if the page including the requested memory location is being accessed by an active software transaction. The hardware transaction 10 may also perform additional operations to avoid conflicts with other hardware transactions, such as by using cache coherency protocols. Further, with the operations of FIGS. 6 and 7, contention between two software transactions occurs if the two software transactions are accessing a same memory location on one memory page. Contention does not occur between two software transactions accessing different memory locations on one page.

In the described embodiments of FIGS. 6 and 7, a software transaction sets a page protection attribute, e.g., the transaction flag 64 (FIG. 3) to prevent a hardware transaction from accessing a memory location on a page being accessed by a software transaction. In alternative embodiments, the software transactions 16 may perform different types of operations to prevent a hardware transaction 10 from accessing a memory location the software transaction is accessing.

Figure 8:
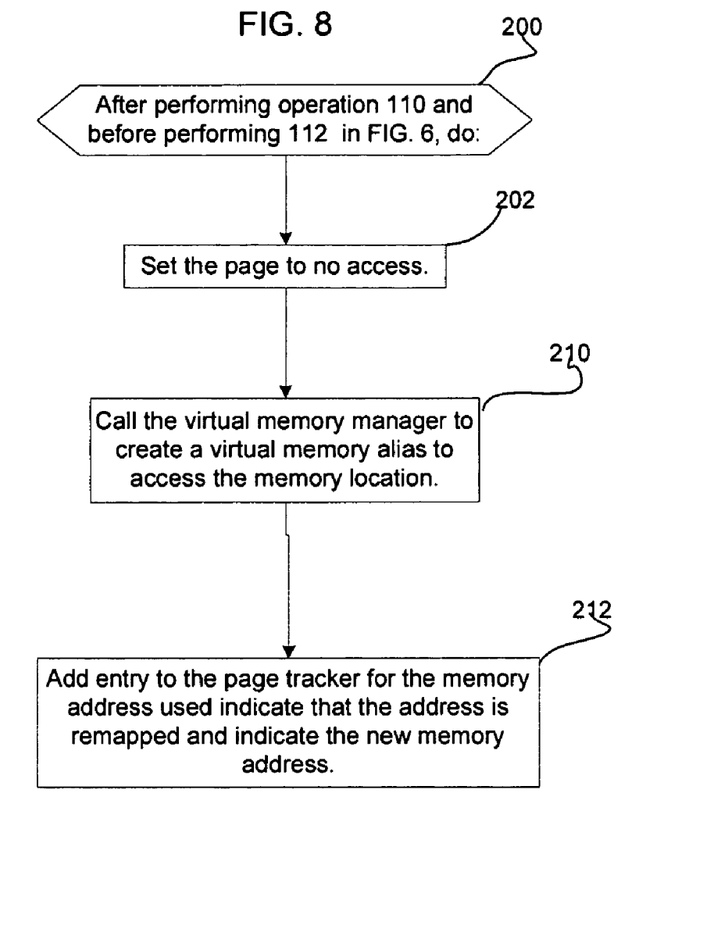
FIGS. 8 and 10 illustrate an additional embodiment of operations performed by a software transaction to access a memory location.
Figure 9:
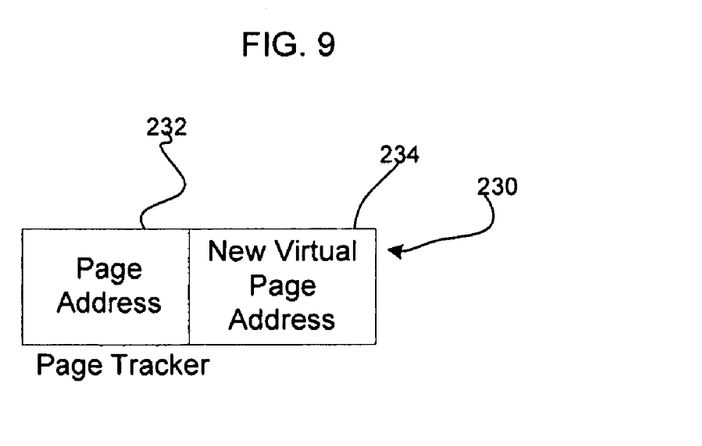
FIG. 9 illustrates an embodiment of page tracking information in the operations of FIG. 8
Figure 10:
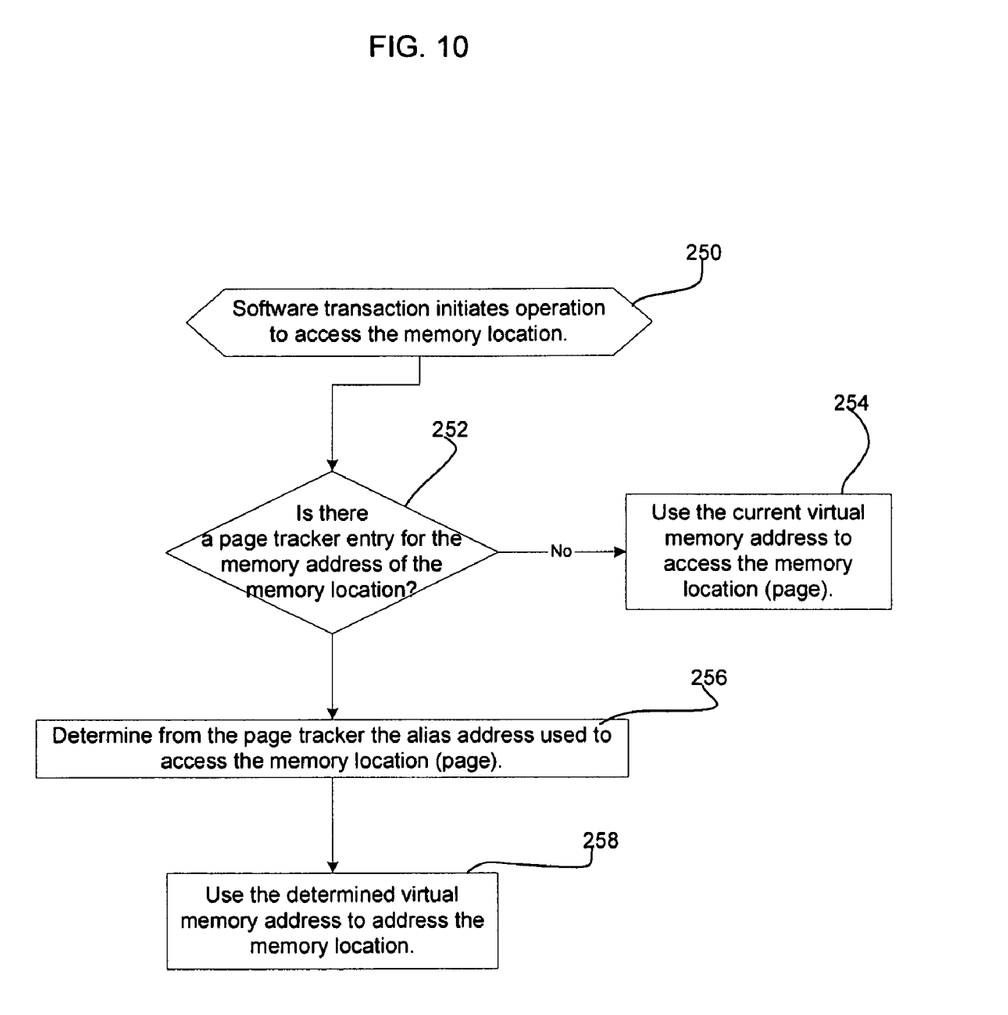

FIGS. 8 and 10 illustrate an alternative embodiment of operations performed by software transactions 18 to cause a page fault to a hardware transaction 10 that tries to access a memory location being accessed by a software transaction 16. With respect to FIG. 8, after performing (at block 200) the operation at block 106 in FIG. 6 and before performing 112, the software transaction 16 obtaining access of a memory location will set (at block 202) the page 18 to no access. Setting the page 18 to "no access" involves changing the page protection attribute, which causes a TLB shootdown and an abort of other hardware transactions accessing the page. However, even though the page is changed to "no access", then the software transaction and other software transactions need to access the page. To allow software transactions 16 to access the page, the software transaction that caused the TLB shootdown may call (at block 210) the virtual memory manager 22 to create a virtual memory alias, which may involve creating a new entry in operating system page tables so that a new virtual page is mapped to the same physical page (that is, the physical page that was just set to no access). The software transaction 16 uses this new virtual page (or the aliased page) to access the memory locations. To communicate the use of the new virtual memory address (aliased page) to other software transactions, the software transaction 16 stores information on the remapped page in a page tracker data structure, e.g., 30. In the embodiment of FIG. 9 the page tracker 30 has an entry 230 for each page that has been remapped to a new virtual address, and each entry 230 includes a page address 232 of the page remapped to a new virtual address and the new virtual address 234. The software transaction 16 updates (at block 212) the page tracker entry 230 with the page address 232 that has been remapped and the new virtual address 234 for software transactions to use to access that page. Thus, if the TLB 12 tries to access the memory location for a hardware transaction 10 using the old virtual address, then an error will be returned because the virtual memory address used by the TLB 12 is no longer valid.

FIG. 10 illustrates an embodiment of operations performed by a software transaction 16 in the embodiment where a previous software transaction 16 remaps the virtual address of a memory location to prevent a hardware transaction 10 from accessing that memory location. The operations of FIG. 10 may be performed as part of block 112 in FIG. 6 when a software transaction begins to access the memory location. In this embodiment, the operations in blocks 108 and 110 would not be performed, i.e. the operations in block 106 would be followed by the operations in block 112. When initiating (at block 250) an operation to access a memory location, the software transaction 16 determines (at block 252) whether there is a page tracker entry 230 in the page tracker data structure 30 for the memory location. If not, then the software transaction 16 uses (at block 254) the current or known virtual memory address to access the memory location. If there is a page tracker entry 230, then the software transaction 16 determines (at block 256) from the page tracker entry 230 the new virtual memory address 234, i.e., the alias address, used for the memory location changed by another software transaction. The software transaction 16 then uses (at block 258) the determined virtual memory address to access the memory location. Thus, other software transactions 16 will not be blocked from accessing the memory location when the virtual address is changed because the new virtual address is indicated in the page tracker entry 230. However, hardware transactions may abort because they do not access the page tracker 30 when accessing a memory location.

With the described embodiments, of FIGS. 8, 9, and 10, the access fault may occur only if the hardware transaction is accessing or attempting to access a memory location in the same page as another location being accessed by a software transaction. After the software transaction has committed or finished, it then changes the page back to full access so that faults are no longer triggered. Thus, only while the software transaction is running is the page set to no access to prevent any hardware transactions from conflicting with the software transaction. Also when the page is reset back to full access, the information in the page tracker is updated to indicate that the page is no longer remapped and no longer has a new virtual address.

With the described embodiments, a software transaction performs operations that cause a fault, such as an access fault, to be returned to a hardware transaction that is accessing or attempting to access a memory location. In certain embodiments, the fault may be returned to the hardware transaction if the hardware transaction is accessing or attempting to access a memory location on a page including a memory location. Alternatively, the fault may only be returned if the hardware transaction is accessing a same memory location being accessed by a software transaction.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, in which code may be implemented. Of course, those skilled in the art will recognize that many modifications may be made to this configuration without departing from the scope of the present invention, and that the article of manufacture may comprise suitable information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, a fault was returned to a hardware transaction attempting to access or accessing a memory location in response to operations performed by a software transaction. In alternative embodiments, an alternative return code or message may be provided to the hardware transaction to cause it to abort if a software transaction is accessing or initiating access to the requested memory location or page including the requested memory location.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 6, 7, 8 and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A machine-readable storage medium including instructions that when executed cause a system to:
    initiate, by a hardware transaction to execute using hardware of a processor, a request to access a memory location, wherein the hardware transaction and a software transaction to execute using a memory coupled to the processor are capable of accessing memory locations; and
    perform an operation, by the software transaction, to cause a return of a page fault to the request by the hardware transaction, the operation including to set a page of the memory including the memory location to no access, request a change to a virtual memory address used to access the memory location to a new virtual memory address, and insert an entry into a page tracker to map the virtual memory address to the new virtual memory address to enable the software transaction and other software transactions to access the page and to prevent the hardware transaction from accessing the page.

2. The machine-readable medium of claim 1, further comprising instructions that when executed enable the software transaction to access any memory location on the page of the memory including the memory location of the request to cause the return of the page fault.

3. The machine-readable medium of claim 2, further comprising instructions that when executed enable the software transaction to indicate the page including the memory location as accessed by the software transaction.

4. The machine-readable medium of claim 2, further comprising instructions that when executed enable the software transaction to write a transaction flag in a page protection attribute for the page, the transaction flag to indicate that the software transaction has access to the page.

5. The machine-readable medium of claim 1, further comprising instructions that when executed responsive to the page fault enable the hardware transaction to access the page tracker to determine whether the memory location is being accessed by the software transaction, and to abort the hardware transaction in response to determining that the memory location is being accessed by the software transaction.

6. The machine-readable medium of claim 5, further comprising instructions that when executed enable the hardware transaction to call a virtual memory manager to load the page including the memory location into the memory to enable the hardware transaction to access the memory location if it is determined that the page is not being accessed by the software transaction.

7. The machine-readable medium of claim 1, further comprising instructions that when executed enable the page fault to return to the hardware transaction in response to the hardware transaction not using the new virtual memory address to access the memory location.

8. The machine-readable medium of claim 1, wherein the operation by the software transaction that causes the return of the page fault occurs after the hardware transaction is provided access to the requested memory location.

9. A system comprising:
    a processor having a storage and a translation lookaside buffer (TLB), wherein the processor is to execute hardware transactions using the storage; and
    a memory coupled to the processor having a plurality of memory locations, the memory including a software transactional memory (STM) ownership table to be used by software transactions to synchronize access to the memory locations, wherein a hardware transaction is to initiate a request in the processor to access one of the memory locations and a software transaction is to execute in the memory to perform an operation that causes a return of a page fault to the request of the hardware transaction, the operation including to set a page of the memory including the memory location to no access, request a change to a virtual memory address used to access the memory location to a new virtual memory address, and insert an entry into a page tracker to map the virtual memory address to the new virtual memory address to enable the software transaction and other software transactions to access the page and to prevent the hardware transaction from accessing the page.

10. The system of claim 9, wherein the STM ownership table includes a plurality of records each to point to a transaction descriptor to provide information regarding a software transaction that is granted access to a corresponding memory location.

11. The system of claim 10, wherein each transaction descriptor includes an identifier of the software transaction, a status of the software transaction and a local copy of the memory locations being accessed.

12. The system of claim 9, wherein the memory includes a plurality of pages each associated with a protection attribute having a transaction flag to indicate whether a software transaction has access to a memory location on the corresponding page.

13. The system of claim 9, wherein the software transaction is to indicate a page of the memory including the memory location requested by the hardware transaction as accessed by the software transaction to cause the page fault.

14. The system of claim 9, wherein responsive to the page fault the hardware transaction is to access the page tracker to determine whether the memory location is being accessed by the software transaction, and to abort the hardware transaction in response to determining that the memory location is being accessed by the software transaction.

15. A method comprising:
    initiating a request to access a memory location by a hardware transaction executing on a processor; and
    performing an operation, by a software transaction that executes using a memory coupled to the processor to cause a return of a page fault responsive to the request by the hardware transaction, the operation including setting a page of the memory including the memory location to no access, requesting a change to a virtual memory address used to access the memory location to a new virtual memory address, and inserting an entry into a page tracker to map the virtual memory address to the new virtual memory address to enable the software transaction and other software transactions to access the page and to prevent the hardware transaction from accessing the page.

16. The method of claim 15, further comprising enabling the software transaction to access any memory location on the page of the memory including the memory location of the request to cause the return of the page fault.

17. The method of claim 16, further comprising enabling the software transaction to write a transaction flag in a page protection attribute for the page, the transaction flag to indicate that the software transaction has access to the memory location.

18. The method of claim 15, further comprising responsive to the page fault accessing the page tracker by the hardware transaction to determine whether the memory location is being accessed by the software transaction, and aborting the hardware transaction in response to determining that the memory location is being accessed by the software transaction.

19. The method of claim 15, further comprising enabling software transactions to access the page tracker when initiating an access to a memory location and preventing hardware transactions from accessing the page tracker when initiating an access to a memory location.

* * * * *